US011448063B2

(12) United States Patent
Øy

(10) Patent No.: US 11,448,063 B2
(45) Date of Patent: Sep. 20, 2022

(54) DOWNHOLE MEASUREMENT TOOL ASSEMBLY FOR MEASURING AND STORING AT LEAST ONE QUANTITY IN A WELLBORE AND FOR WIRELESS SURFACE READ-OUT

(71) Applicant: Well ID AS, Sandnes (NO)

(72) Inventor: Lars Øy, Stavanger (NO)

(73) Assignee: Well ID AS, Sandnes (NO)

( * ) Notice: Subject to any disclaimer, the term of this patent is extended or adjusted under 35 U.S.C. 154(b) by 0 days.

(21) Appl. No.: 16/959,456

(22) PCT Filed: Feb. 13, 2019

(86) PCT No.: PCT/NO2019/050036
§ 371 (c)(1),
(2) Date: Jul. 1, 2020

(87) PCT Pub. No.: WO2019/160426
PCT Pub. Date: Aug. 22, 2019

(65) Prior Publication Data

US 2021/0071520 A1 Mar. 11, 2021

(30) Foreign Application Priority Data

Feb. 14, 2018 (NO) .................................... 20180237

(51) Int. Cl.
*E21B 47/13* (2012.01)
*E21B 47/017* (2012.01)
(Continued)

(52) U.S. Cl.
CPC ............ *E21B 47/13* (2020.05); *E21B 47/017* (2020.05); *E21B 47/26* (2020.05); *H01Q 1/04* (2013.01); *H01Q 1/24* (2013.01); *H01Q 1/42* (2013.01)

(58) Field of Classification Search
CPC ........ E21B 47/13; E21B 47/017; E21B 47/26; H01Q 1/04; H01Q 1/24; H01Q 1/42
See application file for complete search history.

(56) References Cited

U.S. PATENT DOCUMENTS 3,905,010 A * 9/1975 Fitzpatrick .............. E21B 47/06
340/854.4
4,736,204 A 4/1988 Davidson
(Continued)

FOREIGN PATENT DOCUMENTS

WO 2008005193 1/2008
WO 2012040220 3/2012
(Continued)

OTHER PUBLICATIONS

Norwegian Search Report for 20180237, dated Jan. 18, 2019.
(Continued)

*Primary Examiner* — Amine Benlagsir
(74) *Attorney, Agent, or Firm* — Andrus Intellectual Property Law, LLP

(57) ABSTRACT

A downhole measurement tool assembly is for measuring at least one quantity in a well-bore, and has: i) a pressure housing; ii) a sensor for measuring the quantity in the wellbore; iii) a memory for storing values of the quantity to obtain stored measurement data for later read-out; iv) an antenna for allowing wireless communication of the stored measurement data between the downhole measurement tool assembly and an external read-out system while the down-hole measurement tool assembly resides at the surface out of the wellbore, wherein the antenna is mounted at an external side of the pressure housing such that it is exposed to pressure in the wellbore when residing in the wellbore; v) a transceiver for controlling the communication via the antenna, and vi) a pressure connector in an external sidewall
(Continued)

Figure 1:
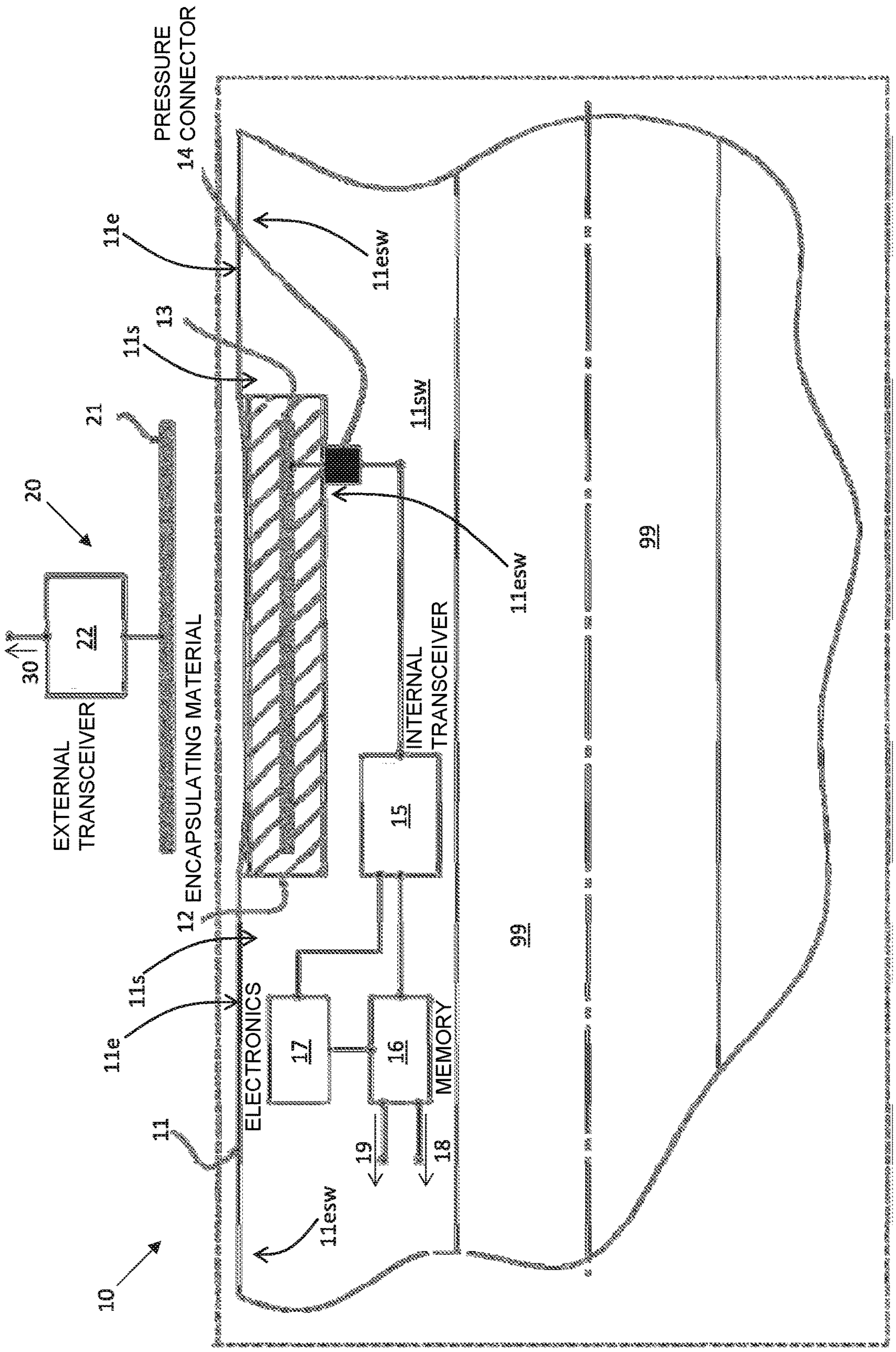

of the pressure housing, wherein the antenna is coupled to the internal transceiver via the pressure connector.

16 Claims, 2 Drawing Sheets

(51) Int. Cl.

| | |
|---|---|
| ***E21B 47/26*** | (2012.01) |
| ***H01Q 1/04*** | (2006.01) |
| ***H01Q 1/24*** | (2006.01) |
| ***H01Q 1/42*** | (2006.01) |

(56) References Cited

U.S. PATENT DOCUMENTS

| | | | | |
|---|---|---|---|---|
| 5,160,925 | A * | 11/1992 | Dailey | E21B 47/13<br>340/853.3 |
| 7,230,542 | B2 * | 6/2007 | Smits | E21B 47/12<br>340/853.9 |
| 2001/0029780 | A1 * | 10/2001 | Bartel | E21B 47/13<br>73/152.03 |
| 2005/0230110 | A1 * | 10/2005 | Ellison | E21B 44/00<br>166/255.1 |
| 2006/0290529 | A1 * | 12/2006 | Flanagan | G01V 11/002<br>340/854.6 |
| 2008/0068209 | A1 * | 3/2008 | Sugiyama | H04L 67/125<br>340/853.2 |
| 2014/0368350 | A1 * | 12/2014 | Wang | E21B 47/12<br>340/854.4 |
| 2016/0115783 | A1 | 4/2016 | Zeng et al. | |

FOREIGN PATENT DOCUMENTS

| | | |
|---|---|---|
| WO | 2014132078 | 9/2014 |
| WO | 2018049024 | 3/2018 |

OTHER PUBLICATIONS

International Search Report and the Written Opinion for PCT/NO2019/050036, dated Apr. 30, 2019.

Reply to the Written Opinion PCT/N02019/050036, dated Aug. 27, 2019.

Written Opinion for PCT/NO2019/050036, dated May 12, 2020.

* cited by examiner

DOWNHOLE MEASUREMENT TOOL ASSEMBLY FOR MEASURING AND STORING AT LEAST ONE QUANTITY IN A WELLBORE AND FOR WIRELESS SURFACE READ-OUT

CROSS-REFERENCE TO RELATED APPLICATIONS

This application is the U.S. national stage application of International Application PCT/N02019/050036, filed Feb. 13, 2019, which international application was published on Aug. 22, 2019, as International Publication WO 2019/160426 in the English language. The International Application claims priority of Norwegian Patent Application No. 20180237, filed Feb. 14, 2018. The international application and Norwegian application are both incorporated herein by reference, in entirety.

FIELD OF THE INVENTION

The invention relates to a downhole measurement tool assembly for measuring and storing at least one quantity in a wellbore. The invention further relates to a downhole measurement tool system comprising such downhole measurement tool assembly. More generally, the invention relates to a wireless communication interface between a downhole measurement tool assembly and a surface system such as a computer or a similar device that is able to send/receive/store data as well as send control commands back to the tool wirelessly, when the downhole tool assembly is at surface out of the wellbore.

BACKGROUND OF THE INVENTION

Downhole measurement tools are used in several industries, such as, but not limited to, the hydrocarbon exploration and production (E&P) industry. At present there is a plethora of downhole measurement tools that are applied in a wellbore, examples are, but not limited to, Measurement-While-Drilling (MWD) tools, Logging-While-Drilling (LWD) tools, Directional Drilling tools, wireline, and the like. One or more downhole measurement tools, connected together, forms a downhole measurement tool assembly. Such downhole measurement tool assemblies are extensively used to efficiently drill (and steer) the well in the desired direction and to obtain measurements while drilling to evaluate and interpret where to place the wellbore in order to reach the desired target and/or optimize for production of oil and gas.

Many of the Downhole Measurement tools, such as MWD and LWD tools, store all or parts of the measurements made whilst downhole in a memory locally to the downhole tool and/or in a central memory storage accessible in another downhole measurement tool as part of the downhole measurement tool assembly, which typically is a part of the bottom hole assembly. The measurements (and other data such as diagnostics) residing in the memory is typically retrieved when the downhole measurement tool assembly is pulled to surface. The operation of pulling a bottom hole assembly to surface, and subsequently reading and lying down or setting back the bottom hole assembly in the setback is considered in the critical path, and for efficiency and cost reasons seek to minimize the time taken for such operations. The time taken to read a downhole measurement tool assembly memory (dump memory) and/or power down (control) a downhole measurement tool assembly is therefore important to improve efficiency by making decisions earlier, to reduce cost and to reduce (and/or eliminate) health-safety and environmental hazards.

Surface communication with a downhole measurement tool assembly is typically performed with cables, where an operator removes the necessary protection of the downhole tool, such as plugs, in order to physically connect to the downhole tool, and start the communication. This is typically performed at the drill floor, and represents several hazards, such as dropped objects and ignition.

The wellbore can present extremely harsh (hazardous) environment where high temperatures, high pressures and severe mechanical loading is encountered. For several reasons, such as high cost of re-performance and potential catastrophic consequences of wellbore/drill string integrity issues, the downhole measurement tools that are subjected to this environment must perform flawlessly, therefore downhole measurement tool design integrity is of paramount matters.

In many cases, several downhole measurement tools are required, and typically for practical reasons shipped to the drilling site in sections. The sections are made-up and built in the derrick to form an assembly called a downhole measurement tool assembly.

A key element to this background is the preparation and configuration of the downhole measurement tool(s) prior to the operation of running in with the bottom hole assembly. The operation of configuring (communication to) the downhole measurement tool assembly is typically performed while the downhole measurement tools are hanging in the derrick and/or in the drill floor slips for several reasons, such as the downhole measurement tools may require to be electrically connected to a power and communication bus, requiring an active connection to all (or several) downhole measurement tools included in the downhole measurement tool assembly and/or for calibration and confidence testing purposes. This means that the operation takes place at the drill floor which is very often classified as “red zone” and work permits are required for operating equipment which is not intrinsically safe. The communication is traditionally carried out using a surface system, by physically connecting a cable (including connector) to the downhole tool. The surface system typically also consists of a computer and may be situated at the drill floor or otherwise connected via a cable to other locations at the rig. The connector residing in the downhole measurement tool is often behind a plug and/or hatch like solution, to protect the connector from the harsh environment whilst downhole. As there are many hazards at the drill floor, the operation of connecting and communicating with a downhole tool is often performed sequentially as opposed to simultaneous with other operations on the rig, meaning that most, if not all, other operations at the drill floor stop and wait until the operation of communicating with the downhole measurement tool is finished and complete. This said operation of physically connecting and communicating with the downhole measurement tool at the drill floor not only puts the operator in danger but exposes the downhole measurement tool vital electronics to the drill floor environment which is often full of debris and drilling mud.

In post drilling activities when the tool has been retrieved from the wellbore, there are two means by which the data can be accessed and read; the tool can either remain coupled to the remaining drill string or alternatively it will have to be disconnected and removed from the drill string. The data is then extracted the same way as when the tool has been initially set up by means of a physical, hardwired connection to the computer or a similar device.

In the case of accessing the data whilst the tool is still part of the drill string, the operator must enter the hazardous "red zone", remove a sidewall readout plug and connect a plug and/or cable into the tool to retrieve the data, as well as functionally shut-down the tool. As mentioned earlier, this not only puts the operator in great danger but also exposes the vulnerable electrical connections to the drill floor environment and the rig will have to wait until this is finished. Additionally, whilst the tool is still connected to the remaining drill string there may be a time factor involved as there will be a limited amount of time given to establish communication and retrieve the data, since the geologist and drilling engineers are highly interested in getting access to the data.

If the downhole measurement tool assembly can be removed it can be relocated to a safe area where the operator can safely carry out the task of making an electrical connection and extracting the data. This is generally close to the wellsite or in some instances it can be a distance away where the tool will require transportation before any connections can be made. The data extraction processes described can therefore be time consuming but more critically detrimental to the data transfer where there are risks of seized connector caps, blocked electrical connection points, poor contact due to dirt ingress, broken connector contacts, etc. These risks can pose a huge effect on the overall project resulting in compromising safety, budget and time factors which are highly prized during oil exploration.

For the problems described above some technologies have been presented.

WO2008/005193A2 discloses an example of a method and system for wireless communication. FIG. 2 of this document shows the use of an antenna mounted internally within the pressure housing and using a pressure sealing window, which is made from a material that is non-attenuating to the wireless signal. This arrangement presents a potential issue, where the non-metallic material used for the pressure sealing window negatively effects the structural integrity of the pressure housing. As mentioned previously the drilling environment is extremely arduous presenting elevated temperatures, pressures and mechanical loading. There have been significant advances in material science, however non-metallic materials still present limitations in terms of strength and temperature capabilities when presented next to the metallic derivatives, thereby utilizing a non-metallic pressure-sealing window could be detrimental to the structural integrity of the pressure retaining body.

U.S. Pat. No. 4,736,204 discloses a resistivity downhole measurement tool comprising of external sensors for measuring the formation. This tool applies the same sensors as wireless antennas during data transfer operations. This method of data transfer utilizing the downhole sensor, although it being wireless, requires the transmitter/receiver to be in close proximity of the external sensors/antennas of the measurement tool. This can be disadvantageous in instances where the measurement tool is located in a hazardous location especially when it is still part of the drilling string whereby an operator would be required to place a transmitter/receiver to make the necessary data transfer.

In view of the above described problems there is a further need to develop wireless transmission solution for downhole tools, in particular downhole measurement tool assemblies, when the downhole tool assembly is at the surface out of the wellbore.

SUMMARY OF THE INVENTION

The invention has for its object to remedy or to reduce at least one of the drawbacks of the prior art, or at least to provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a downhole measurement tool assembly for measuring at least one quantity in a wellbore. The downhole measurement tool assembly comprises:

a pressure housing;

at least one sensor mounted in the downhole measurement tool assembly for measuring the at least one quantity in the wellbore;

a memory coupled to the at least one sensor for storing values of the at least one quantity to obtained stored measurement data for later read-out;

an antenna that is dedicated to and configured for allowing wireless communication of the stored measurement data between the downhole measurement tool assembly and an external read-out system while both the external read-out-system and the downhole measurement tool assembly reside at the surface out of the wellbore, wherein the antenna is mounted at an external side of the pressure housing such that it is exposed to (direct) pressure in the wellbore when residing in the wellbore;

a transceiver being located in the pressure housing and being coupled to the antenna for controlling the communication via the antenna, and a pressure connector provided in an external sidewall of the pressure housing, wherein the antenna is coupled to the internal transceiver via the pressure connector.

The effects of the features of the downhole measurement tool assembly in accordance with the invention are as follows. First of all, the downhole measurement tool assembly is configured for measuring at least one quantity in the wellbore and for storing values of said at least one quantity to obtain stored measurement data. In addition, the downhole measurement tool assembly is configured for wirelessly communicating said information (stored measurement data) to an external read-out system through an antenna system. It is important to note that this read-out only occurs at the surface out of the wellbore. The downhole measurement tool assembly is not configured for real-time communication of measurement data. While residing downhole the downhole measurement tool is configured for only measuring and storing measurement data and not for communicating said data. The downhole measurement tool is only communicating said stores measurement data with the externally located read-out system while residing at the surface out of the wellbore. The antenna on the downhole measurement tool assembly itself is dedicated to the required communication of the stored measurement data between the downhole measurement tool assembly and the external read-out system while both the external read-out system and the downhole measurement tool assembly reside at the surface out of the wellbore. In addition, this antenna is externally provided, that is it is provided at the exterior of the pressure housing without the presence of a pressure sealing window. That the antenna is provided at the exterior side of the pressure housing does not exclude the possibility that it could be located in a trench provided at the exterior of the pressure housing. The pressure connector can either be a separate part or it can be integrated with the antenna. As long as the antenna is subject to the external pressure of the wellbore (when residing in the wellbore) it falls within the scope of the claims. The pressure connector allows the antenna, that is exposed to the external pressure, to be connected to the transceiver that is located within the pressure housing and exposed to lower pressures.

The invention, in contrast with WO2008/005193A2, avoids the described pressure seal window in WO2008/005193A2 and the window's potential negative effect on the mechanical strength of the pressure retaining components. In addition, locating the antenna on the exterior of the pressure housing additionally improves transmission of the wireless signal, thereby reducing the chance of data corruption during a memory dump and potential control issues of the downhole measurement tool assembly.

In order to facilitate understanding of the invention, one or more expressions are further defined hereinafter.

Wherever the wording "drill floor" is used, this is interpreted to be the heart of any drilling rig (such as an oil rig, but the drill floor may also be on a boat or other floating vessel), i.e. the area where the drill string begins its trip into the earth. It is traditionally where joints of pipe are assembled, as well as the downhole measurement tool assembly, bottom hole assembly including drilling bit, and various other tool assemblies. This is the primary work location for roughnecks and the driller. The drill floor is located directly under the derrick or drill tower. The floor is typically a relatively small work area in which the rig crew conducts operations, usually adding or removing drill pipe to or from the drill string. The drill floor is the most dangerous location on the rig because heavy iron is moved around there.

In a first main embodiment of the downhole measurement tool assembly in accordance with the invention, the antenna is provided within a recess in the pressure housing. The advantage of this embodiment is that the antenna is more protected against wear caused by cuttings, mud, oil, water and other substances that are present in the wellbore.

In a further embodiment of the downhole measurement tool assembly in accordance with the invention the antenna is encapsulated in an encapsulation material within the recess. The encapsulation material helps in further protecting the antenna against wear. The encapsulation material may be selected from a group consisting of: epoxy, fiberglass, polymeric, elastomeric.

In a second main embodiment of the downhole measurement tool assembly in accordance with the invention, the antenna is provided on an external surface of the pressure housing. The advantage of this embodiment is that the integrity of the pressure housing is not compromised.

In a further embodiment of the downhole measurement tool assembly in accordance with the invention the antenna has been mounted to the pressure housing by techniques selected from the group consisting of: mechanical fastening, chemical bonding, pressure bonding, and interference fastening.

In an embodiment of the downhole measurement tool assembly in accordance with the invention the antenna is covered by a cover layer. The cover layer helps in further protecting the antenna against wear. The material for cover layer may be selected from a group consisting of: epoxy, fiberglass, polymeric, elastomeric.

In an embodiment of the downhole measurement tool assembly in accordance with the invention the downhole measurement tool assembly further comprises at least one more antenna that is dedicated to and configured for allowing communication of measurement data between the downhole measurement tool assembly and the external read-out system while both the external read-out system and the downhole measurement tool assembly reside at the surface out of the wellbore. Using multiple antennas for communication allows for communicating information in parallel OR it may be used to make a more sophisticated antenna system, wherein said antennas are configured to cooperate.

In a first variant of the last embodiment of the downhole measurement tool assembly in accordance with the invention, said antennas are distributed around the circumference of the downhole measurement tool assembly.

In a second variant of said embodiment of the downhole measurement tool assembly in accordance with the invention, said antennas are distributed over the length of the downhole measurement tool assembly.

The first and second variant may also be combined, particularly where there are three or more antennas on the downhole measurement tool assembly.

In a second aspect the invention relates to a downhole measurement tool system comprising the downhole measurement tool assembly in accordance with the invention and an external read-out system, wherein the external read-out system comprises a further antenna and a further transceiver coupled to the further antenna for controlling the communication via the further antenna. As is true for every (wireless) communication system there is both a sender and a receiver side, wherein the roles of these sides even may change back and forth. The downhole measurement tool system in accordance with the second aspect expands the invention from the downhole measurement tool assembly to the actual external read-out system that is used to read-out said downhole measurement tool assembly from a distance while residing at the surface out of the wellbore.

In a first main embodiment of the downhole measurement tool system in accordance with the invention the external read-out system is further coupled to other surface equipment. This coupling may be wireless or wired. In a second main embodiment of the downhole measurement tool system in accordance with the invention the external read-out system forms part of surface equipment. In both main embodiments the surface equipment may be selected from the group consisting of: computer, laptop, mobile device and tablet.

BRIEF INTRODUCTION OF THE DRAWINGS

Figure 2A:
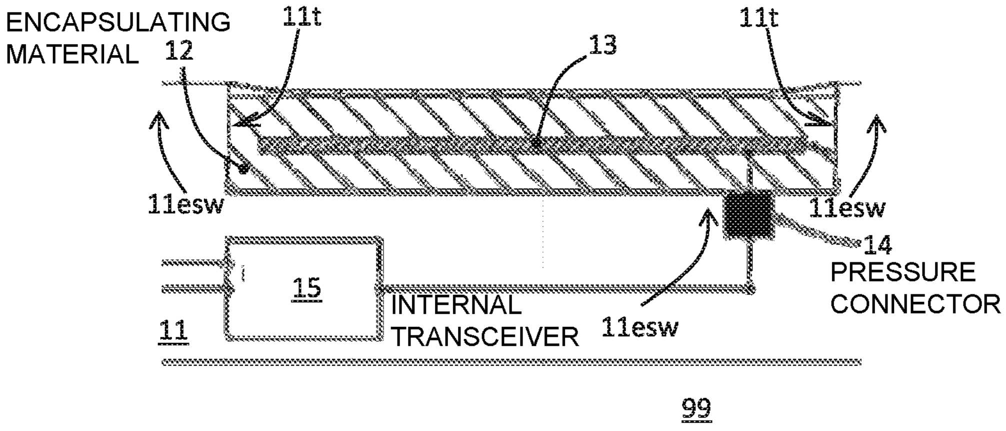
Figure 2B:
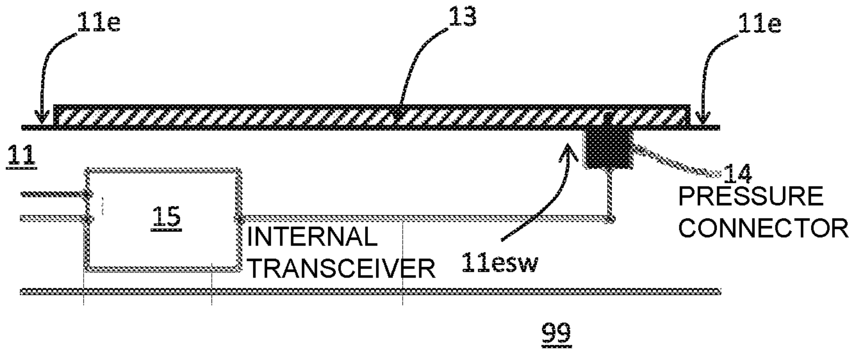
Figure 2C:
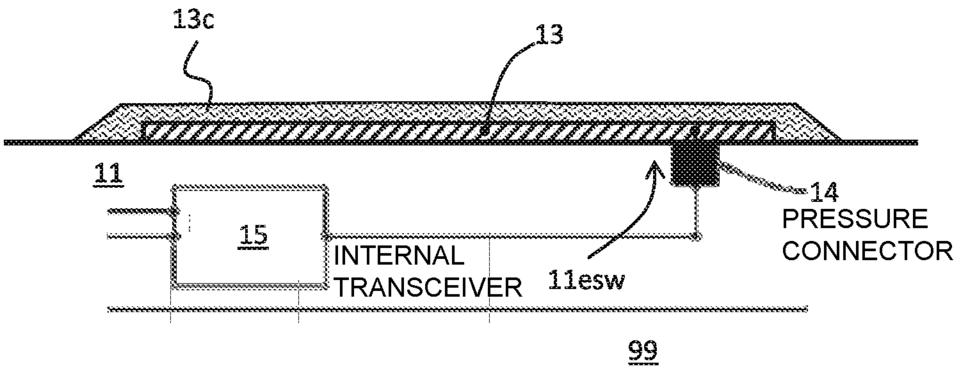

In the following is described an example of a preferred embodiment illustrated in the accompanying drawings, wherein:

FIG. 1 shows a part of a downhole measurement tool assembly in accordance with an embodiment of the invention, and FIGS. 2*a*-2*c* show detailed views of alternative embodiments concerning the antenna placement of the downhole measurement tool assembly.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase.

The purpose of the invention is to achieve a wireless communication interface between a downhole measurement tool assembly and a surface system such as a computer or a similar device that is able to send/receive/store data as well as send control commands back to the downhole measurement tool assembly wirelessly. This new technology offers efficient means of wireless data transfer with an additional advantage of ensuring that the mechanical integrity of the pressure housing is not compromised. This innovative means of wireless communication can be applied to a variety of downhole measurement tools from through-bore drill string mounted items to fully enclosed pressure housings mounted within the bore of the drill string.

The solution will reduce costs and reduce risk in that it will avoid operators to have to connect to the downhole measurement tool assembly at drill floor with associated HSE risk and personnel cost. It will also reduce costs by eliminating the rig idle time, while operators establish physical connection with the downhole measurement tool assembly and communicates with the downhole measurement tool assembly over the wire.

FIG. 1 shows a part of a downhole measurement tool assembly 10 in accordance with an embodiment of the invention. The figure does not show all of the downhole measurement tool assembly 10. In fact, the largest part of the downhole measurement tool assembly 10 is not shown. The figure mainly focuses on the communication part of the downhole measurement tool assembly 10. Obviously, the downhole measurement tool assembly 10 also comprises measurement part(s) (not shown) for measuring at least one quantity in a wellbore (not shown). Examples of such quantity that is measured in a wellbore, are: directional surveys, formation resistivity, formation gamma ray radiation, formation density, formation porosity, internal and external pressures, mud temperature and vibration. The measurement parts can be in the same pressure housing 11 or in other pressure housings being a part of the downhole measurement tool assembly 10.

The downhole measurement tool assembly 10 in FIG. 1 is configured to form part of a drillstring, i.e. it is configured to form a linking member having threaded sections like the drillstring pipes have. To that end the downhole measurement tool assembly 10 is formed as a hollow member, i.e. it comprises a pressure housing 11 having a through-bore 99. The though-bore 99 allows drilling fluids to flow through it. The pressure housing 11 may be a metallic object which is of a round profile and depending on what function it serves it can have a through-bore as in FIG. 1 running through the centre. In an alternative embodiment the pressure housing 11 is fully enclosed containing a cavity comprising all necessary internal components. A further purpose of the pressure housing 11 is to house, in a sidewall 11*esw* thereof, associated electronics necessary to drive the intended electronic sensors and communication devices. The pressure housing 11 isolates the external environment from the internal environment such that no pressure and media acts upon the electronics provided therein. In many cases several pressure housings are physically connected together with threaded connection in a bottom hole assembly while signals, like measurement data, can be communicated in between the pressure housings, typically through electric wires.

The downhole measurement tool assembly 10 further comprises an antenna 13 that is provided at the external side 11*s* of the pressure housing 11. In this embodiment the antenna 13 is provided in a recess 11*t* (FIG. 2*a*) at the external side 11*s* of the pressure housing 11. In this way the antenna 13 is effectively placed in the external sidewall 11*esw* of the pressure housing 11 as illustrated, wherein the external sidewall 11*esw* is effectively defined by the external surface 11*e* of the downhole measurement tool assembly 10 as well as the recess 11*t*. The antenna 13 is encapsulated in an encapsulation material 12. Even when being provided in the recess 11*t* at the external side 11*s* of the pressure housing 11 as illustrated, the antenna 13 is still exposed to conditions like the pressure in the wellbore. Because of this fact the antenna 13 is connected to further circuitry (such as an internal transceiver 15) through a pressure connector 14 (pressure connector) as illustrated. The pressure connector 14 acts as a signal interface between the antenna 13 and the internal transceiver 15 as well as that it isolates the internal environment from the external pressure and media. The pressure connector 14 can be of several forms. It may comprise of two separate components which are physically coupled to transmit an electrical signal, or it may consist of a bulkhead arrangement, where the connection is permanent to provide an electrical path between said antenna 13 and the internal transceiver 15. However, it is important that the configuration of the pressure connector 14 does not compromise the pressure sealing aspect or quality of the signal transfer.

The transceiver 15 is located in the pressure housing 11 and is coupled to the antenna 13 for controlling the communication via the antenna 13. The transceiver 15 is further coupled to a memory 16, wherein measured values of the at least one quantity are stored, also referred to as "measurement data". The memory 16 can be in the same pressure housing 11 as the transceiver 15 or in another pressure housing placed in the downhole measurement tool assembly 10, as long as the memory 16 can communicate and transfer signals to the transceiver 15. Additional electronics 17 are provided and coupled to the transceiver 15 and the memory 16 for controlling and steering the communication of measurement data. Furthermore, the memory 16 is also coupled to power lines 18 and bus lines (communication buses) 19 that are present in the downhole measurement tool assembly 10.

So far, only the communication circuitry at the side the downhole measurement tool assembly 10 were discussed. On the other side of the communication system there is an external read-out system 20, which comprises a further antenna 21 coupled to a further (external) transceiver 22 as illustrated in FIG. 1. The external transceiver 22 is further connected to other surface equipment 30 as illustrated. However, in other embodiments the external read-out system 20 forms part of the surface equipment 30.

FIGS. 2*a*-2*c* show alternative embodiments concerning the antenna placement of the downhole measurement tool assembly 10. FIG. 2*a* illustrates the antenna 13 as depicted in FIG. 1 as a wireless transmitting device situated in a recess 11*t* at the external sidewall 11*esw* of the pressure housing 11, which is in operational communication with the internal transceiver 15, memory 16 and electronics 17 via an interfacing pressure connector 14 as earlier discussed. Due to the fact that the antenna 13 is mounted externally, it is subject to external pressure. However, some protection is provided using the encapsulating material 12.

As FIG. 2*b* illustrates, the antenna 13 may also be secured to the external surface 11*e* of the pressure housing 11 without using a recessed area. This takes away the need for potting, and the formation of a recessed groove in the pressure housing 11. However, in this embodiment the antenna 13 will be exposed to debris present in the well fluids and also to physical impact in case the downhole measurement tool bumps into the sidewalls of the well-bore.

FIG. 2*c* illustrates a minor variation on the embodiment of FIG. 2*b*, wherein the antenna 13 is covered by a cover layer 13*c*. The cover layer 13*c* may comprise similar material as the earlier-discussed encapsulation layer 12.

In a variation on the embodiments of FIG. 2*a*-2*c*, it is also possible to provide the antenna 13 as a modular unit, i.e. as a pre-encapsulated unit that is ready to be secured into a recess or directly onto the outer surface of the pressure housing 11.

Potting/encapsulating material 12 as shown on FIG. 1/FIG. 2*a* is a material which is used to encapsulate the antenna 13 within a blind recess/pocket 11*t*. The purpose of the encapsulant is to secure the antenna 13 in the given location and also provide physical protection against the drilling fluids and other downhole media. The encapsulating material 12 may be selected from a group comprising; epoxy, fiberglass, polymeric, non-metallic, elastomeric, composite, etc. The selected encapsulation material 12 must not attenuate too much and/or block the signal emitted by the antenna 13.

The external transmission devices represented in FIG. 1 are the further antenna 21 and the external transceiver 22, the summation of herein mentioned components can also be classified as a standalone system 20, which is able to receive and transmit signals wirelessly; and additionally, store data and issue command prompts which are also transmitted wirelessly. Alternatively, the antenna 21 and the external transceiver 22 can form a passive wireless device 20, which relays the signals between a suitable surface equipment system 30 and the antenna 13 mounted on the pressure housing 11.

The system comprising of the elements depicted in FIG. 1 and their respective layout can be applied to any downhole measurement tool assembly application or any tool assembly that is capable of gathering and/or storing data in a downhole environment. For this embodiment of the titled invention a general case of method of operation will be described.

As previously mentioned in the embodiment of this disclosure the summation of external components antenna 21 and external transceiver 22 can be realised as a computer capable of being receptive to a wireless signal emitted by the antenna 13, where the data can be stored and/or where control signals can be transmitted back to the downhole measurement tool assembly 10 wirelessly while both the external read-out system 20 and the downhole measurement tool assembly 10 reside at the surface out of the wellbore. It is also possible to treat the summation of the external antenna 21 and the external transceiver 22 as a standalone passive device 20 which relays the signal to an external surface device 30 such as a computer, the communication to the external surface device 30 can be but is not limited to wireless communication and/or wired connection. A plurality of external surface devices 30, antennas 21 and external transceivers 22 can exist which in turn can create a network and/or extend the line of communication.

An important purpose of the invention is to establish wireless tool communication while at the same time ensuring that the mechanical components, in particular the pressure housing 11, remains structurally intact, thereby not permitting the external environment of the downhole measurement tool assembly 10 to penetrate the intentionally sealed internal components. In contrast with the prior art solutions, this is resolved by placing the antenna 13, which is capable of transmitting a wireless signal, on the outer surface(s) of the pressure housing 11. This is possible because of the use of the pressure connector 14, which acts as a signal interface between the antenna 13 and the internal transceiver 15 as well as isolating the internal environment from the external pressure and media. With the antenna 13 being located on the exterior surface of the pressure housing 11 the wireless signal being emitted/received will undergo minimal attenuation thereby improving the signal strength and reducing the probability of transmitting corrupted data.

The fundamental principle of operation for the current invention is that data and commands can be wirelessly exchanged between the downhole measurement tool assembly 10, the perimeter of which is indicated by the dotted line in FIG. 1 and a surface equipment 30, while both the external read-out system 20 and the downhole measurement tool assembly 10 reside at the surface out of the wellbore.

Referring to FIG. 1 the dotted line represents a simplistic system of a downhole measurement tool assembly 10, where the quantities of depicted components can be at least one and extend to “n” quantity. Thereby it is possible to have one memory and several internal transmitters conveying signals to several antennas, and/or several memory storages conveying signals to one internal transmitter. This invention is scalable, however at least one of each component must be present.

The data which is collected by the downhole measurement tool assembly 10 is communicated through the downhole measurement tool assembly 10 by means of a bus-type network 19 and distributed to the necessary components, this will include raw data taken from various sensors and transducers and command prompts allowing forms of control within the downhole measurement tool assembly 10. The power will be supplied internally by means of internal battery pack (not shown). Communication occurs when data and/or command prompts are stored within the memory 16 and communicated with the internal transceiver 15, which generates a wireless signal that is carried through the pressure connector 14 and emitted by means of an antenna 13 mounted to the extremity of the pressure housing 11. The further antenna 21 coupled to an external transmitter device 22 can be mounted at a distance away from, as well as being located in close proximity of, the antenna 13 and be receptive of the wireless signal emitted by antenna 13.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb “comprise” and its conjugations does not exclude the presence of elements or steps other than those stated in a claim. The article “a” or “an” preceding an element does not exclude the presence of a plurality of such elements. The mere fact that certain measures are recited in mutually different dependent claims does not indicate that a combination of these measures cannot be used to advantage. In the device claims enumerating several means, several of these means may be embodied by one and the same item of hardware.

The invention claimed is:

1. A downhole measurement tool assembly for measuring at least one quantity in a wellbore, wherein the downhole measurement tool assembly comprises:

a pressure housing;

at least one sensor mounted in the downhole measurement tool assembly for measuring the at least one quantity in the wellbore, wherein the downhole measurement tool assembly further comprises:

a memory coupled to the at least one sensor for storing values of the at least one quantity to obtain stored measurement data for later read-out;

an antenna that is dedicated to and configured for allowing wireless communication of the stored measurement data between the downhole measurement tool assembly and an external read-out system while both the external read-out system and the downhole measurement tool assembly reside at the Earth’s surface out of the wellbore, wherein the antenna is mounted at an external side of the pressure housing such that it is exposed to direct pressure in the wellbore when residing in the wellbore;

a transceiver being located in the pressure housing and being coupled to the antenna for controlling the communication via the antenna, and a pressure connector provided in an external sidewall of the pressure housing, wherein the antenna is coupled to an internal transceiver via the pressure connector.

2. The downhole measurement tool assembly according to claim 1, wherein the antenna is provided within a recess in the pressure housing.

3. The downhole measurement tool assembly according to claim 2, wherein the antenna is encapsulated in an encapsulation material within the recess.

4. The downhole measurement tool assembly according to claim 1, wherein the antenna is provided on an external surface of the pressure housing.

5. The downhole measurement tool assembly according to claim 4, wherein the antenna has been mounted to the pressure housing by techniques selected from the group consisting of: mechanical fastening, chemical bonding, pressure bonding, and interference fastening.

6. The downhole measurement tool assembly according to claim 5, wherein the antenna is covered by a cover layer.

7. The downhole measurement tool assembly according to claim 4, wherein the antenna is covered by a cover layer.

8. The downhole measurement tool assembly according to claim 1, wherein the downhole measurement tool assembly further comprises at least one more antenna that is dedicated to and configured for allowing the wireless communication of the stored measurement data between the downhole measurement tool assembly and the external read-out system.

9. The downhole measurement tool assembly according to claim 8, wherein the antenna and the at least one more antenna are distributed around a circumference of the downhole measurement tool assembly.

10. The downhole measurement tool assembly according to claim 9, wherein the antenna and the at least one more antenna are distributed over a length of the downhole measurement tool assembly.

11. The downhole measurement tool assembly according to claim 8, wherein the antenna and the at least one more antenna are distributed over a length of the downhole measurement tool assembly.

12. A downhole measurement tool system comprising:

a downhole measurement tool assembly for measuring at least one quantity in a wellbore, the downhole measurement tool assembly comprising:

a pressure housing;

at least one sensor mounted in the downhole measurement tool assembly for measuring the at least one quantity in the wellbore, wherein the downhole measurement tool assembly further comprises:

a memory coupled to the at least one sensor for storing values of the at least one quantity to obtain stored measurement data for later read-out;

an antenna that is dedicated to and configured for allowing wireless communication of the stored measurement data between the downhole measurement tool assembly and an external read-out system while both the external read-out system and the downhole measurement tool assembly reside at the Earth’s surface out of the wellbore, wherein the antenna is mounted at an external side of the pressure housing such that it is exposed to direct pressure in the wellbore when residing in the wellbore;

a transceiver being located in the pressure housing and being coupled to the antenna for controlling the communication via the antenna; and a pressure connector provided in an external sidewall of the pressure housing, wherein the antenna is coupled to an internal transceiver via the pressure connector;

the external read-out system, wherein the external read-out system comprises a further antenna and a further transceiver coupled to the further antenna for controlling the communication via the further antenna.

13. The downhole measurement tool system according to claim 12, wherein the external read-out system is further coupled to surface equipment.

14. The downhole measurement tool system according to claim 13, wherein the surface equipment is selected from the group consisting of: computer, laptop, mobile device and tablet.

15. The downhole measurement tool system according to claim 12, wherein the external read-out system forms part of surface equipment.

16. The downhole measurement tool system according to claim 15, wherein the surface equipment is selected from the group consisting of: computer, laptop, mobile device and tablet.

* * * * *